Dec. 6, 1938. W. R. KALES 2,139,548
RUNNING GEAR
Original Filed April 12, 1937  2 Sheets-Sheet 1

INVENTOR
WILLIAM R. KALES
BY
*ATTORNEYS*

Dec. 6, 1938.   W. R. KALES   2,139,548
RUNNING GEAR
Original Filed April 12, 1937   2 Sheets-Sheet 2

INVENTOR
WILLIAM R. KALES
BY
ATTORNEYS

Patented Dec. 6, 1938

2,139,548

UNITED STATES PATENT OFFICE 2,139,548

RUNNING GEAR

William R. Kales, Detroit, Mich., assignor to Whitehead & Kales Company, River Rouge, Mich., a corporation of Michigan Original application April 12, 1937, Serial No. 136,472. Divided and this application November 15, 1937, Serial No. 174,711

10 Claims. (Cl. 280—124)

This invention relates generally to running gears and constitutes a division of an application for "Running gear" filed April 12, 1937, bearing Serial No. 136,472.

One of the essential objects of the invention is to provide a novel means in a tandem wheel assembly for absorbing stresses due to braking torque so that such stresses will not react differently upon the tandem wheels.

Another object is to provide an assembly of this type wherein the tandem wheels have separate brake anchorages designed to produce substantially equal reactions on the wheels.

Another object is to provide an assembly wherein leaf springs not only function as spring suspensions but also serve to distribute the load between the wheels.

Another object is to provide an assembly that is comparatively simple in construction, economical to manufacture and efficient in operation.

Other objects, advantages and novel details of construction of this invention will be made more apparent as this description proceeds, especially when considered in connection with the accompanying drawings, wherein.

Figure 1:
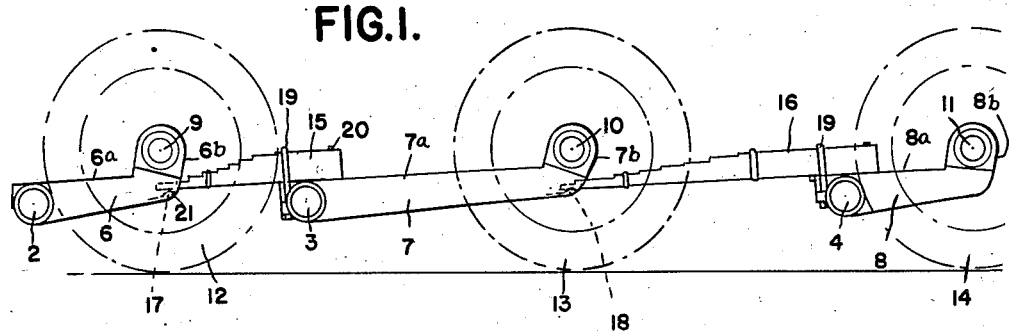
Figure 1 is a diagrammatic side elevation of a running gear embodying my invention.
Figure 4:
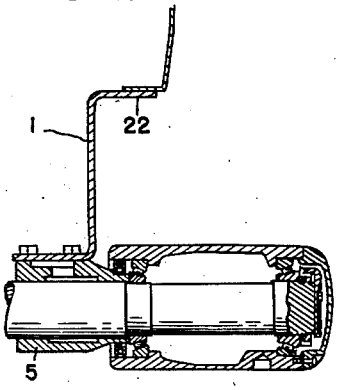
Figure 4 is a vertical cross section on line 4—4 of Figure 2.
Figure 5:
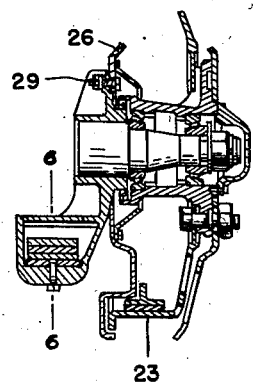
Figure 5 is a vertical cross section on line 5—5 of Figure 2.
Figure 6:
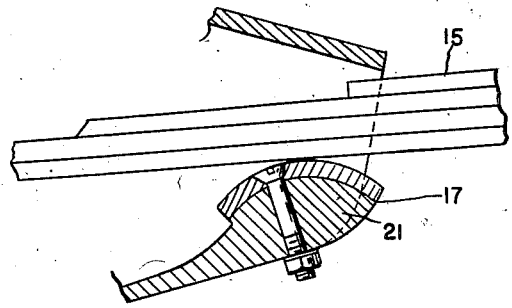
Figure 6 is an enlarged longitudinal section on line 6—6 of Figure 5.
Figure 3:
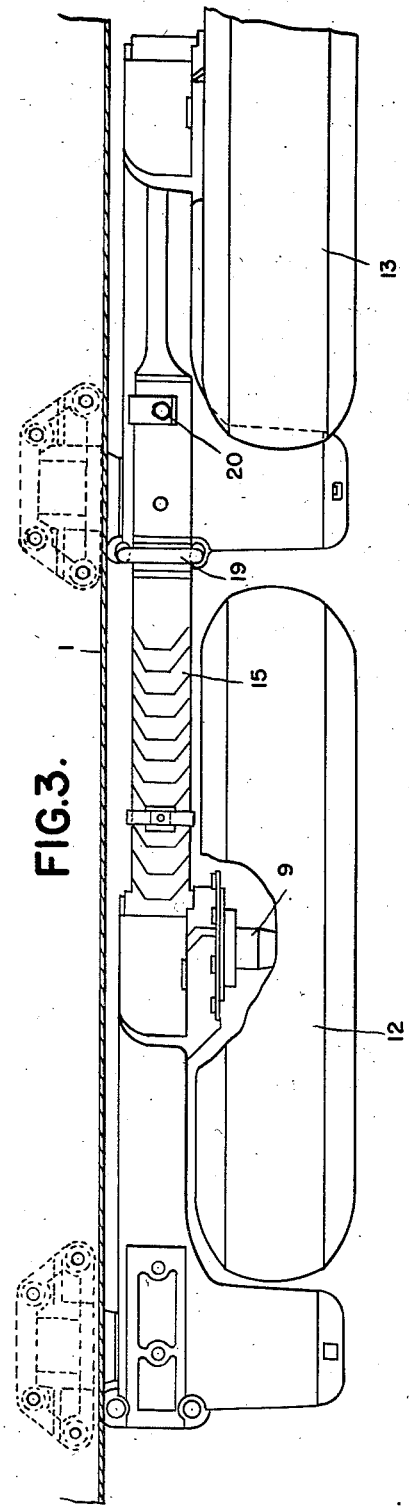
Figure 3 is a plan view thereof.
Figure 2:
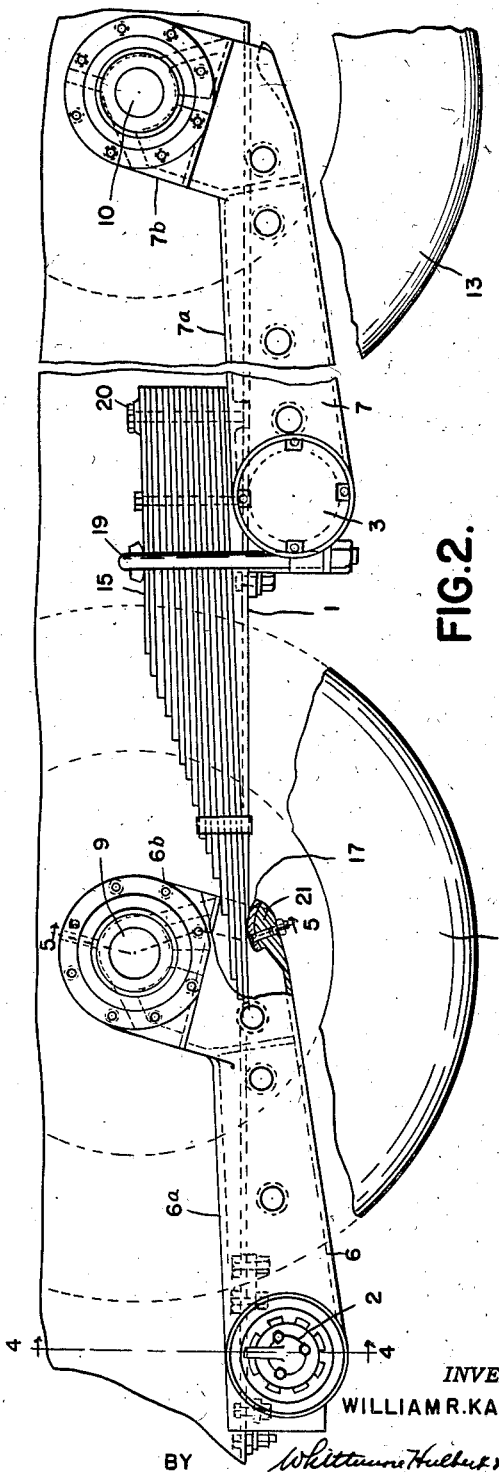
Figure 2 is a side elevation of a portion of a vehicle to which my improved tandem wheel structure is applied.

My improved running gear is particularly adapted for use on vehicles designed to carry heavy loads, such for instance as automobile transports. These are usually trailers in which the greater part of the load is carried upon the tandem wheels arranged upon opposite sides and near the rear end. The trailer is usually drawn by a truck which controls its movement as well as sustaining a portion of the load.

My improvement consists essentially in providing separate brake anchorages for the tandem wheels and so designing these anchorages as to produce equal reactions on the wheels and in the same direction. As specifically shown, this is accomplished by mounting each wheel on a rock arm and having the rock arms extend in the same direction from their respective wheels to the point of attachment on the vehicle frame. The brakes for the tandem wheels are anchored to these rock arms, and the braking torque reaction will, therefore, be the same on each of the wheels. In order to equally distribute the load to the tandem wheels, there is also a walking beam connection between the same.

In detail, 1 is a sill of the vehicle frame, and 2, 3 and 4, respectively, are dead axles extending across the vehicle beneath the sills and connected to the latter through bearings 5. 6, 7 and 8, respectively, are rock arms pivotally mounted on the axles 2, 3 and 4, respectively, and extending rearwardly therefrom. 9, 10 and 11, respectively, are stub axles projecting laterally outward from the rock arms at their free ends, and 12, 13 and 14, respectively, are ground-engaging wheels arranged in tandem and mounted on these stub axles.

The rock arms 7 and 8 are provided with spring arms 15 and 16 extending oppositely therefrom and into load sustaining engagement with the rock arm for the adjacent wheel, as indicated at 17 and 18. It will be noted that the central wheel 13 sustains the load transmitted thereto through both the rock arm 7 and the spring arm 16, whereas the end wheels 12 and 14 sustain only the load transmitted respectively through the spring arm 15 and the rock arm 8. Therefore, to obtain equal distribution of load on each of the wheels, the rock arm 7 and spring arm 16 are each twice the length of the spring arm 15 and rock arm 8.

Preferably the leaves of the spring arms 15 and 16 are rigidly secured to the rock arms 7 and 8, respectively, by U-clips 19 and bolts 20 and are slidably supported on arcuate bearings 21 carried by the rock arms 6 and 7. To provide the proper clearance with the sills 1, the rock arms 6, 7 and 8 have portions 6ª, 7ª and 8ª, respectively, extending substantially horizontally from the dead axles 2, 3 and 4, respectively, and also have outwardly offset, upwardly extending portions 6ᵇ, 7ᵇ and 8ᵇ, respectively, to which the stub axles 9, 10 and 11, respectively, are secured. In use, the portions 6ª, 7ª and 8ª of the rock arms extend beneath the outwardly extending flange 22 of the sills, but there is sufficient clearance therebetween for the maximum oscillation of the rock arms. The portions 6ᵇ, 7ᵇ and 8ᵇ, respectively, of the rock arms clear this flange 22 and therefore can swing upward above the same. Thus, the dead axles 2, 3 and 4 can be arranged considerably below the normal height of the stub axles 9, 10 and 11. As a result, the flooring of the vehicle may be flat throughout its length and low to the ground so that it may be loaded and unloaded easily. Moreover, as the wheels 12, 13 and 14, together with their stub axles 9, 10 and 11 and the upwardly extending portions 6b, 7b and 8b, respectively, of the rock arms are outside the sills of the vehicle, the interior of the vehicle will be unobstructed and capable of carrying the maximum load.

Brake drums 23 are mounted upon the wheels 12, 13 and 14, and the brake heads 26 are secured by bolts 29 to the portions 6b, 7b and 8b of the rock arms. Preferably these heads 26 form the anchorage for the brake friction means (not shown) and thus will transmit the torque reaction therefrom into the rock arms 6, 7 and 8.

As the rock arms 6, 7 and 8 extend in the same direction from their pivotal connection with the dead axles, the reactions will be the same in the tandem wheels. In this connection it should be noted that the wheels 12, 13 and 14 always remain in the same vertical plane with respect to the adjacent side of the vehicle. Thus, while the wheels are free to independently rise and fall, they always remain parallel to the adjacent side of the vehicle. Consequently, clearance between the said wheels and vehicle may be cut down to the minimum. It should also be noted that each rock arm forms a radius rod for its respective wheel and for defining the path of movement thereof.

What I claim as my invention is:

1. In a vehicle running gear, the combination with a frame, of tandem wheels for supporting the frame including a pair of end wheels and one or more intermediate wheels, independently movable rock arms pivotally connected to said frame and having stub axles for said wheels, one end wheel and the intermediate wheel being provided with spring arms having load sustaining connections with the rock arms for the adjacent wheels, and brake mechanism for said wheels including brake heads fixed to said rock arms.

2. In a vehicle running gear, the combination with a frame, of tandem wheels for supporting the frame including a pair of end wheels and one or more intermediate wheels, independently movable rock arms extending in the same direction from said frame and respectively connected to said wheels, the rock arms for one end wheel and the intermediate wheel being provided with spring arms extending oppositely therefrom and having load sustaining connections with the rock arms for the adjacent wheels, and brake mechanism for said wheels carried in part by said rock arms.

3. In a vehicle running gear, the combination with a frame, of tandem wheels for supporting the frame including a pair of end wheels and one or more intermediate wheels, independently movable rock arms pivotally connected to said frame and having stub axles for said wheels, one end wheel and the intermediate wheel being provided with spring arms having load sustaining connections with the rock arms for the adjacent wheels, the rock arm for the intermediate wheel and the spring arm in load sustaining engagement therewith being each substantially twice the length respectively of the other spring arm and of the rock arms for the end wheels, and brake mechanism for said wheels carried in part by said rock arms.

4. In a vehicle running gear, the combination, with a frame, of tandem wheels for supporting the frame including a pair of end wheels and one or more intermediate wheels, independently movable rock arms extending in the same direction from said frame and respectively connected to said wheels, the rock arms for one end wheel and the intermediate wheel being provided with spring arms extending oppositely therefrom and having load sustaining connections with the rock arms for the adjacent wheels, the rock arm for the intermediate wheel and the spring arm in load sustaining engagement therewith being each substantially twice the length respectively of the other spring arm and of the rock arms for the end wheels, and brake mechanism for said wheels including brake heads fixed to said rock arms.

5. In a vehicle running gear, the combination with a frame, of tandem wheels for supporting the same including a pair of end wheels and one or more intermediate wheels, independently movable rock arms on said frame extending therefrom in the same direction and respectively connected to said wheels, and a spring arm connected to the rock arm of each intermediate wheel and also that of one of the end wheels extending oppositely therefrom and having a load sustaining connection with the rock arm for the adjacent wheel, the length of said rock arms and spring arms being proportioned to distribute the load to each of the wheels, and brake mechanism for said wheels including brake heads fixed to said rock arms.

6. In a vehicle running gear, the combination with a frame, of tandem wheels for supporting the same including a pair of end wheels and an intermediate wheel, independently movable rock arms on said frame extending therefrom in the same direction respectively connected to said wheels, and spring arms connected to the rock arm for the intermediate wheel and the rock arm for one of the end wheels extending oppositely therefrom and having load sustaining connections with the rock arms for the adjacent wheels, the cooperating rock arm and spring arm for the intermediate wheel being of greater length than the length of the rock arm and of the spring arm which respectively carry the load into the end wheels, thereby securing proportional distribution of load on all of the wheels, and brake mechanism for said wheels including brake heads fixed to said rock arms.

7. In a vehicle running gear, the combination with a frame, of tandem wheels for supporting said frame including a pair of end wheels and an intermediate wheel, independently movable rock arms for said wheels pivotally connected at one end to said frame and provided at their free ends with stub axles for said wheels, the rock arm for the intermediate wheel being substantially twice as long as either of the other rock arms, said rock arms extending in the same direction from their respective wheels to the points of attachment to the frame, separate brakes for said wheels having heads fixed to the respective rock arms, and oppositely extending spring arms fixed at one end to the rock arms for the intermediate and one end wheel adjacent their point of attachment to the frame and having load sustaining connections with the adjacent rock arms adjacent the stub axles carried thereby, the spring arm fixed to the rock arm for the end wheel aforesaid being substantially twice as long as the spring arm fixed to the intermediate long rock arm.

8. In a vehicle running gear, the combination with a frame, of tandem wheels for supporting said frame including a pair of end wheels and an intermediate wheel, independently movable rock arms for said wheels pivotally connected at one end to said frame and provided at their free ends with stub axles for said wheels, said rock arms extending in the same direction from their respective wheels to the points of attachment to the frame, separate brakes for said wheels having heads fixed to the respective rock arms, and oppositely extending spring arms fixed at one end to two of said rock arms adjacent their point of attachment to the frame and having load sustaining connections with the adjacent rock arms adjacent the stub axles carried thereby.

9. In a vehicle running gear, the combination with a frame, of tandem wheels for supporting said frame including a pair of end wheels and an intermediate wheel, substantially parallel dead axles extending across said frame, independently movable rock arms pivoted at their forward ends upon said axles and provided at their rear ends with stub axles for said wheels, brake drums carried by each wheel, brake heads fixed to the respective rock arms and adapted to carry means for frictionally engaging said brake drums, and spring arms fixed at one end to the rear and intermediate rock arms adjacent their pivotal connection with their respective dead axles and having load sustaining connections with the intermediate and forward rock arms respectively.

10. In a vehicle running gear, the combination with a frame, of tandem wheels for supporting said frame including a pair of end wheels and an intermediate wheel, axles extending transversely beneath said frame, rock arms pivotally mounted on said axles and extending therefrom in the same direction, the free end portions of said rock arms extending upwardly, stub axles mounted in said upwardly extending portions and forming journals for said wheels, separate brakes for said wheels having brake heads fixed to the respective rock arms, and oppositely extending spring arms fixed at one end to the rear and intermediate rock arms adjacent their pivotal connections with their respective dead axles and provided at their free ends with load sustaining connections with the intermediate and forward rock arms respectively adjacent the stub axles carried thereby.

WILLIAM R. KALES.